(12) United States Patent
Manseau

(10) Patent No.: US 6,772,300 B1
(45) Date of Patent: Aug. 3, 2004

(54) METHOD AND APPARATUS FOR MANAGING OUT OF ORDER MEMORY TRANSACTIONS

(75) Inventor: Daniel A. Manseau, Portland, OR (US)

(73) Assignee: Intel Corporation, Santa Clara, CA (US)

(*) Notice: Subject to any disclaimer, the term of this patent is extended or adjusted under 35 U.S.C. 154(b) by 427 days.

(21) Appl. No.: 09/651,437

(22) Filed: Aug. 30, 2000

(51) Int. Cl.[7] .............................................. G06F 12/00
(52) U.S. Cl. .......................... 711/154; 711/5; 711/151; 711/159
(58) Field of Search ............................ 711/5, 159, 151, 711/152, 154, 169; 710/40, 244, 54, 107

(56) References Cited

U.S. PATENT DOCUMENTS 4,794,526 A * 12/1988 May et al. .................. 709/103
5,179,685 A * 1/1993 Nojiri .......................... 712/41
5,251,303 A * 10/1993 Fogg et al. .................... 710/24
5,995,967 A * 11/1999 Iacobovici et al. ......... 707/100
6,137,807 A * 10/2000 Rusu et al. .................. 370/429
6,247,107 B1 * 6/2001 Christie ...................... 711/216
6,317,803 B1 * 11/2001 Rasmussen et al. ........ 710/107
6,434,641 B1 * 8/2002 Haupt et al. ................. 710/54

* cited by examiner

Primary Examiner—Pierre M. Vital
(74) Attorney, Agent, or Firm—Blakely, Sokoloff, Taylor & Zafman LLP

(57) ABSTRACT

According to one embodiment, a computer system is disclosed. The computer system comprises a main memory; and a chip set coupled to the main memory. The chip set comprises a transaction memory, a first bank controller and a second bank controller coupled to the transaction memory. The first bank controller stores transaction data to be transmitted to a first bank of main memory within the transaction memory according to a first linked list. The second bank controller stores transaction data to be transmitted to a second bank of main memory within the transaction memory according to a second linked list.

15 Claims, 5 Drawing Sheets

METHOD AND APPARATUS FOR MANAGING OUT OF ORDER MEMORY TRANSACTIONS

FIELD OF THE INVENTION

The present invention relates to computer systems; more particularly, the present invention relates to executing memory transactions using a linked list.

BACKGROUND

The efficiency of accessing large arrays of a memory device can be improved by enabling out of order accesses of the memory. Typically, larger memory arrays are divided into banks. A bank is a section of memory wherein an access is completed before another access to the same bank can be started. In particular, whenever two transactions access the same bank, the second transaction must wait the full memory access time of the first transaction before it can begin. However, an access to one bank does not delay access to other banks within the memory device. As a result, if two transactions are accessing different banks, a second transaction may begin as soon as it has been received at the memory device. This hides some of the memory access time.

Therefore, in order to further improve access efficiency, transactions to different banks should be done out of order. For example, if three memory transaction are received, the first two to the same bank and the third to a different bank. The first transaction is started but the second is held up because it is to the same bank. Thus, if the transactions were executed in order, the third transaction would also be held up. However, if the transactions are enabled to execute out of order, the third transaction could be started as soon as it was received.

To allow out of order executions, control logic must store the transactions that are stalled and keep track of these stalled transactions until they can be executed. A simple approach is to use a set of first-in-first-out (FIFO) buffers. Each FIFO within the controller may hold the transactions for one bank. Subsequently, an arbiter may select which transaction in a non-empty FIFO will next be executed.

The problem with the above memory mapping method is the number and size of the FIFOs. For a very large memory array, there is typically a large number of banks. Thus, for maximum performance, a FIFO for each bank is required. For instance, a typical memory may be divided into 32 read banks and 4 write banks, resulting in 36 FIFOs. The size of each of the 36 FIFOs is dependent on the number of transactions that may be received. In some applications, the maximum number of transaction that can be handled is 64. Since it is possible for all 64 transactions to go to the same bank, each bank must be capable of storing 64 transactions at one time. As a result, 36 FIFOs requiring 64 storage locations are often required. Providing this amount of storage space for the execution of out of order transactions results in an inefficient use of resources within a computer system. Therefore, a more efficient method and apparatus handling out of order memory transactions is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for managing memory transactions is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
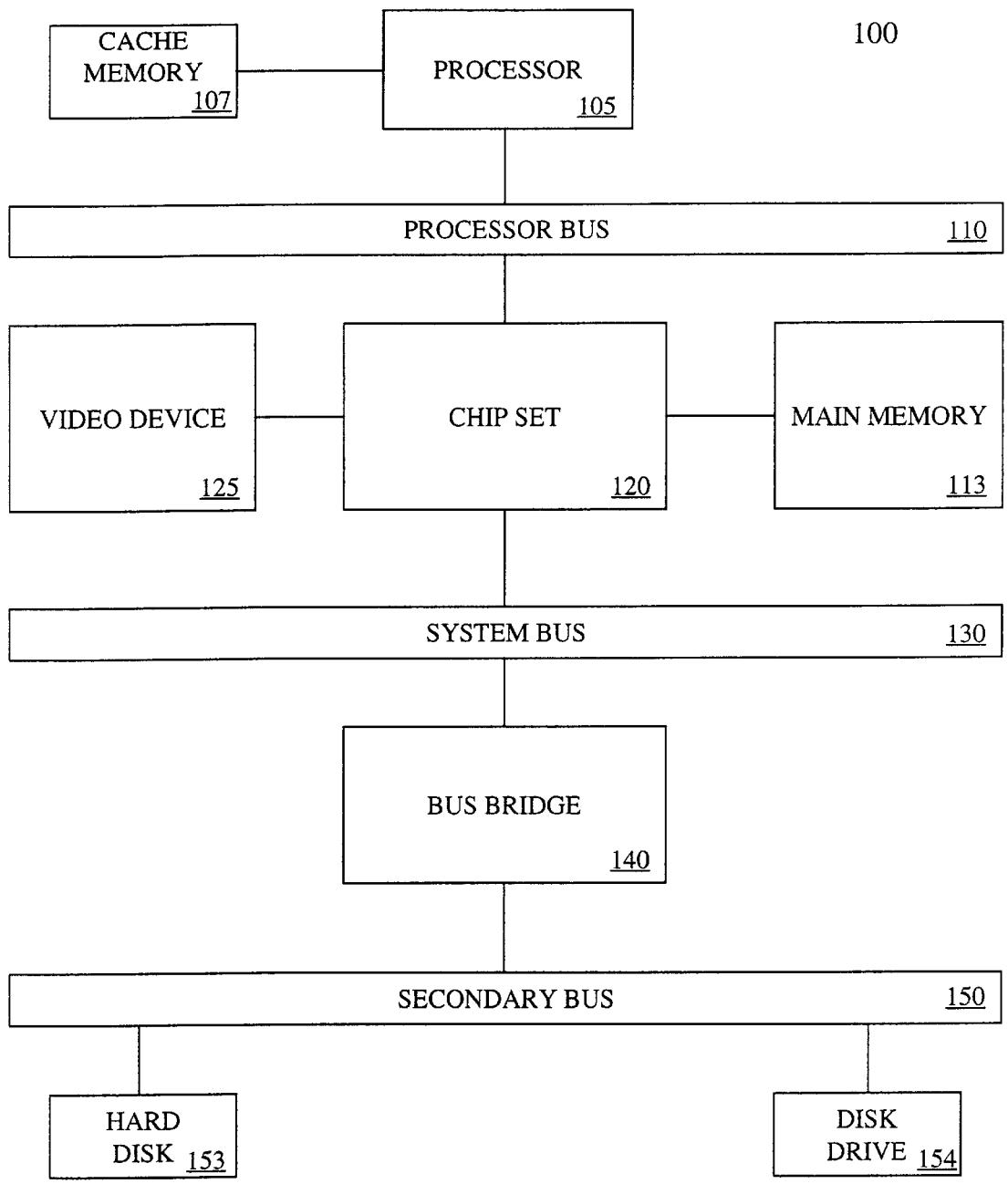
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 460GX chip set available from Intel Corporation; however, other chip sets can also be used. Chip set 120 may include a memory controller for controlling a main memory 113. Further, chipset 120 may also include an Accelerated Graphics Port (AGP) Specification Revision 2.0 interface developed by Intel Corporation of Santa Clara, Calif. The AGP interface is coupled to a video device 125 and handles video data requests to access main memory 113. Moreover, chip set 120 may implement out of order access to memory 113 using a linked list scheme, as described below.

Main memory 113 is coupled to processor bus 110 through chip set 120. Main memory 113 and cache memory 107 store sequences of instructions that are executed by processor 105. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device 125 includes a video monitor such as a cathode ray tube (CRT) or liquid crystal display (LCD) and necessary support circuitry.

Processor bus 110 is couple to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
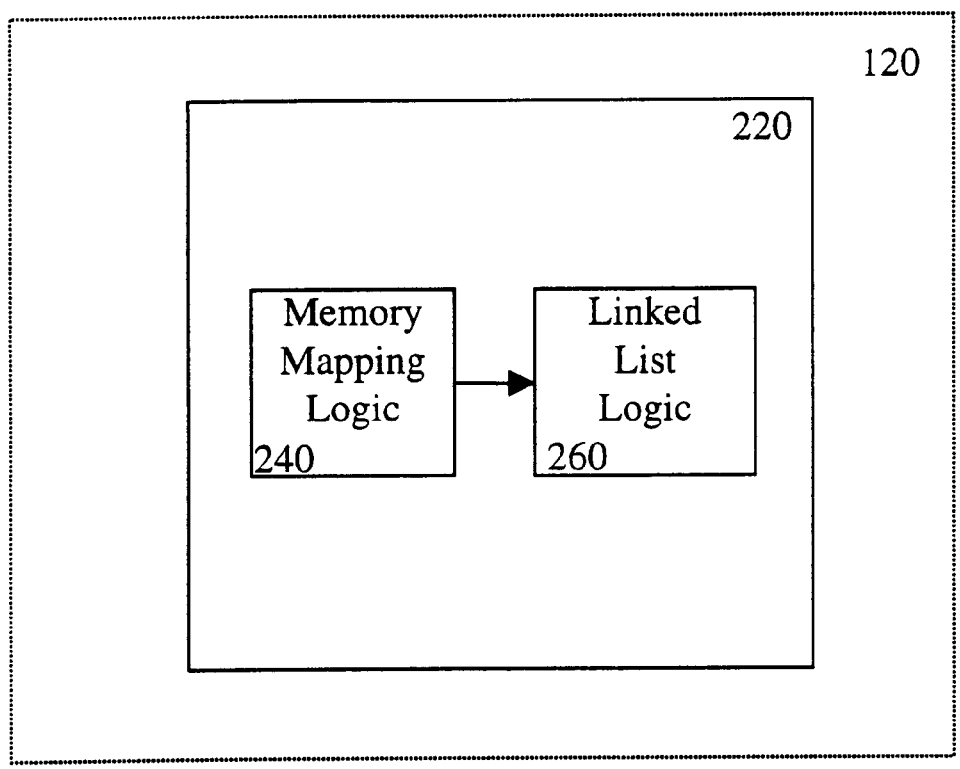
FIG. 2 is a block diagram of one embodiment of a chip set.

FIG. 2 is a block diagram of one embodiment of chip set 120. Chip set 120 includes a memory interface unit (SMI) 220. SMI 220 receives memory transactions that are to access memory 113. According to one embodiment, whenever a new transaction is received, chip set 120 assigns the transaction a unique transaction identification (TX ID). A TX ID is used by chip set 120 to keep track of the received transactions.

SMI 220 includes mapping logic 240 and linked list logic 260. According to one embodiment, mapping logic 240 receives transaction addresses in order to translate the addresses to a physical address. In one embodiment, mapping logic 240 generates bank select (BANK SEL) signals during the address translation. Once mapping logic 240 has determined that a particular transaction is going to memory 113 the transaction is transmitted to linked list logic 260.

Figure 3:
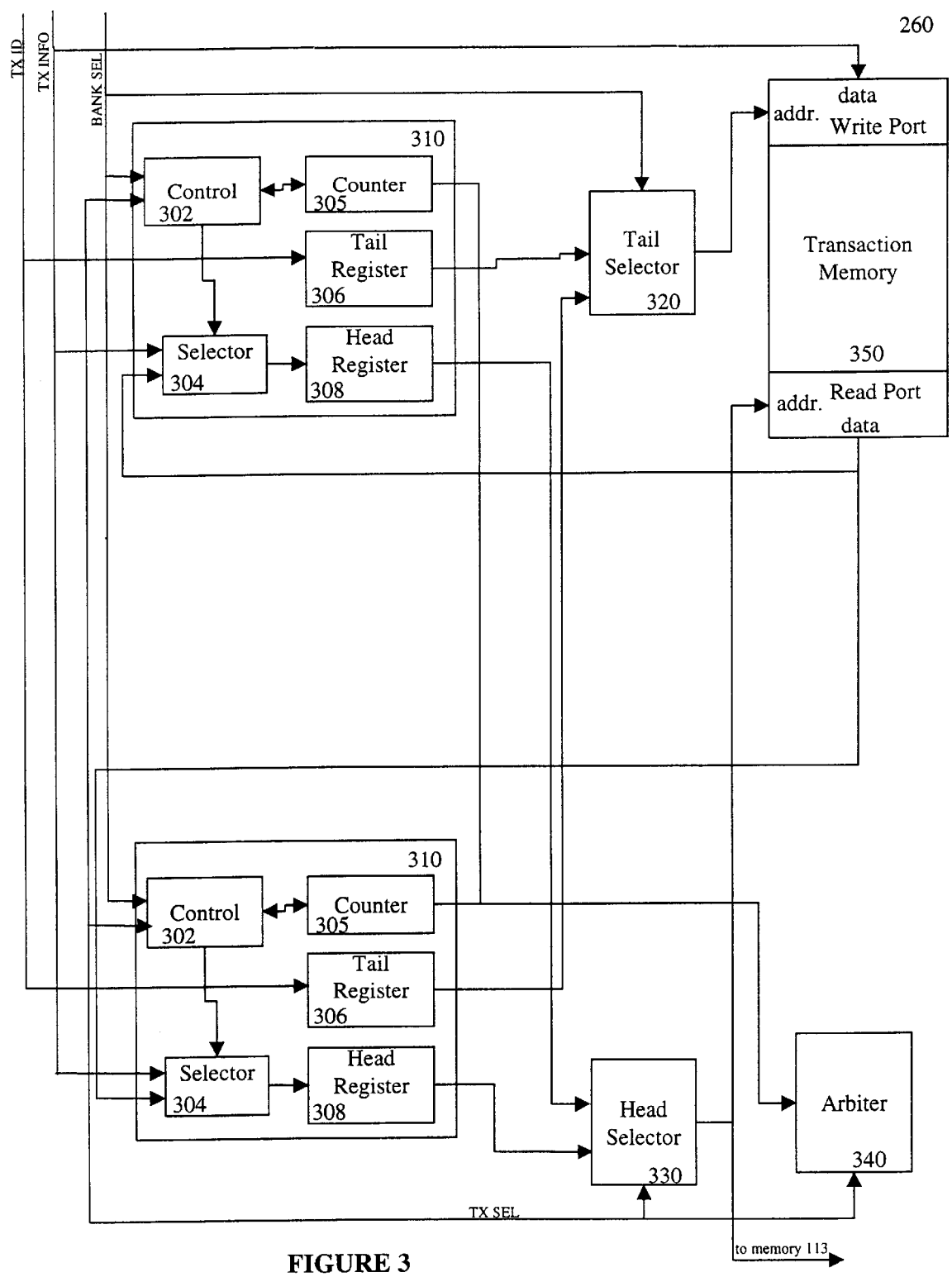
FIG. 3 is a block diagram of one embodiment of linked list logic.

FIG. 3 is a block diagram of one embodiment of linked list logic 260. Linked list logic 260 includes bank controllers 310, tail selector logic 320, head selector logic 330, arbiter 340 and transaction memory 350. Transaction memory 350 is used to temporarily store memory transactions destined for memory 113. Transaction memory 350 includes a write port that receives transaction information, along with a TX ID that is to be stored within transaction memory 350. In addition, transaction memory 350 includes a read port that receives a TX ID and transmits transaction information corresponding with the TX ID.

According to one embodiment, transaction memory 350 is a 64 deep FIFO that is adaptable to store transaction information from each bank controller 310 in a linked list format. However, one of ordinary skill in the art will appreciate that other size FIFOs may be used to implement transaction memory 350 depending upon the application.

According to a further embodiment, the linked lists use TX ID as the index to transaction memory 350. As described above, a unique TX ID is assigned to all new transactions. Consequently, a particular linked list will not attempt to use the same memory 350 location that another linked list is using. Moreover, a TX ID remains with a transaction until the transaction has completed.

Bank controllers 310 control the access to memory 113. In particular, bank controllers 310 receive memory transactions that are addressed to a bank corresponding with the particular bank controller 310. According to one embodiment, there is one bank controller for each bank in memory 113. In a further embodiment, memory 113 is divided into 32 read banks and 4 write banks. Therefore, in such an embodiment, 36 bank controllers 310 are included within linked list logic 260.

Bank controllers 310 each include a control unit 302, selector logic 304, a counter 305, a tail register 306 and a head register 308. Control unit 302 includes logic that is used to determine which bank controller 310 is to manage a particular memory transaction. For example, the BANK SEL signal is received at each bank controller 310, indicating which bank of memory 213 is to be accessed. As a result, the bank controller 310 corresponding with the bank to be accessed receives the particular transaction information.

Control unit 302 also receives a transaction select (TX SEL) signal from arbiter 340. The TX SEL signal indicates which bank controller 310 is selected to access its corresponding bank in memory 113. Selector 304 is coupled to control unit 302 and selects transaction information that is to be received at head register 308.

According to one embodiment, selector 304 receives a select signal from control unit 302 resulting in a selection of transaction information (TX INFO) received at linked list logic 260 or data read from transaction memory 350. In one embodiment, selector 304 is implemented using a multiplexer. However, one of ordinary skill in the art will appreciate that other selector logic may be used to implement selector 304.

Counter 305 is coupled to control unit 302. Counter 305 keeps track of the number of transactions stored in the linked list associated with the particular bank controller 310. According to one embodiment, counter 305 is incremented whenever a transaction is stored within memory 350 and decremented whenever a transaction is retired from memory 350. According to a further embodiment, counter 305 generates a ready signal (READY) whenever the count is greater than zero.

Tail register 306 receives and stores the TX ID of a transaction at the tail end (or last transaction stored) of the particular linked list. Head register 308 is coupled to selector 304. Head register 308 receives and stores all information corresponding with a particular transaction. According to one embodiment, head register 308 stores the TX ID, bank information, as well as other transaction information that may be stored. The bank information directs the transaction to the proper bank controller 310.

Tail selector logic 320 is coupled between tail registers 306 within each bank controller 310 and the write port of transaction memory 350. Tail selector logic 320 selects which bank controller 310 is granted access to the write port of memory 350. In one embodiment, tail selector logic 320 selects a particular bank 310 based upon a received BANK SEL signal. Once a particular bank controller is selected, TX ID is transmitted to the address component of the write port of memory 350. In addition, the transaction information for the new transaction is stored in transaction memory 350 by addressing transaction memory 350 using the TX ID from tail selector 320.

Head selector logic 330 is coupled between head registers 308 within each bank controller 310 and memory 113. Head selector logic 330 selects which bank controller 310 is granted access to memory 113. In one embodiment, head selector logic 330 selects a particular bank 310 based upon a received TX SEL signal. Once a particular bank controller 310 is selected, the transaction information is transmitted from head register 308 to memory 113. In addition, the TX ID portion of the transaction information is transmitted to the read port of transaction memory 350. The TX ID is used by transaction memory 350 to transmit the transaction information stored with the particular TX ID to head register 308.

Arbiter 340 is coupled to head selector 330 and each of the bank controllers 310. Arbiter 340 determines which bank controller 310 is granted access to memory 113. In response to receiving a READY signal from counters 305 from one or more bank controllers 310, arbiter 340 transmits the TX SEL signal to head selector 330, and control units 302, indicating which bank controller 310 is to be granted access to memory 113. Subsequently, the selected bank controller 310 transmits its transaction information via head selector 330.

Figure 4:
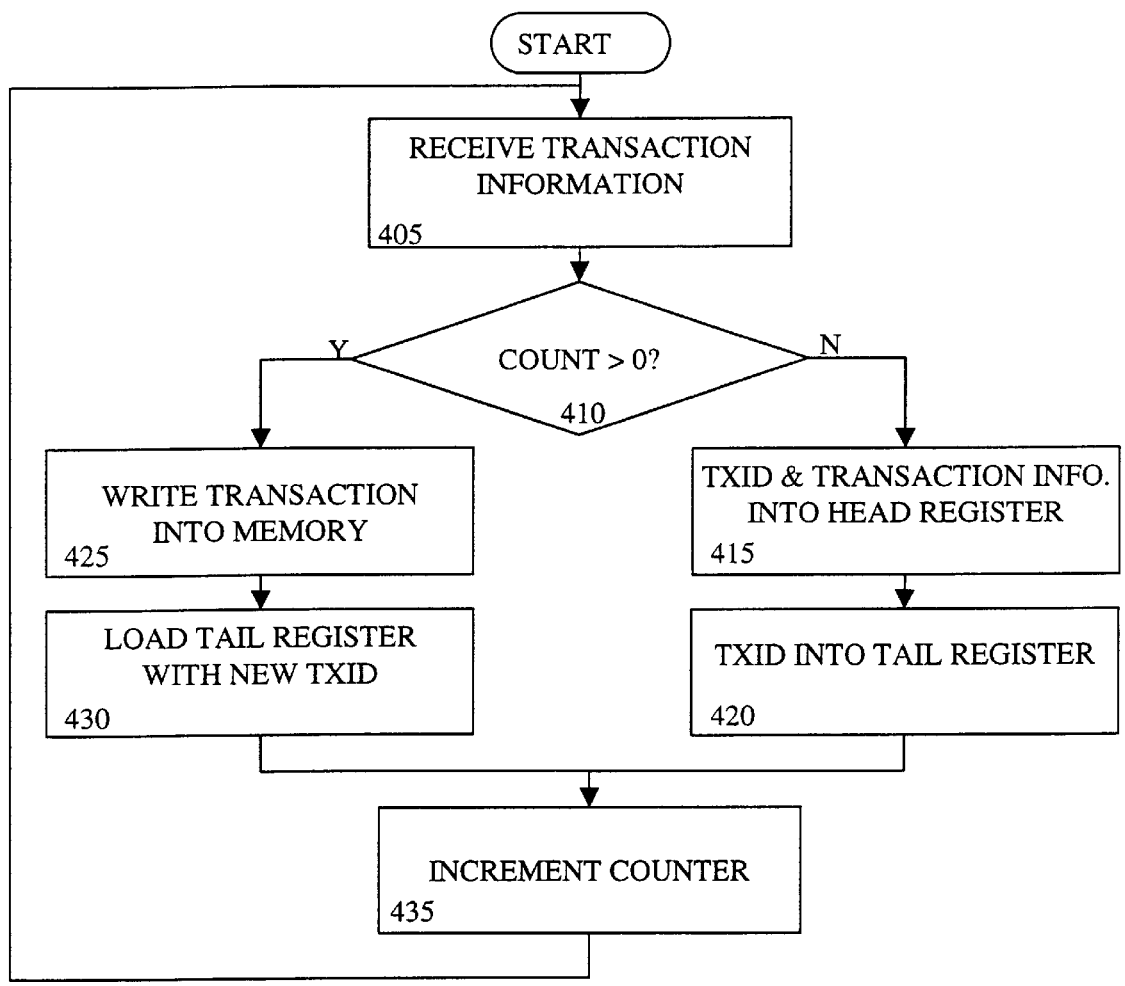
FIG. 4 is a flow diagram of one embodiment for the process of receiving a memory transaction.

FIG. 4 is a flow diagram of one embodiment for the process of receiving a memory transaction at linked list logic 260. At process block 405, transaction information is received at linked list logic 260. As described above, the transaction information includes the TX ID and bank information. The bank information directs the transaction to the appropriate bank controller 310. At the particular bank controller 310 selected to receive the transaction information, counter 305 is checked in order to ascertain the correct count. At process block 410, it is determined whether the count is greater than zero.

If the count is zero, the transaction information and the TX ID are loaded into head register 308 via selector 304, process block 415. At process block 420, the TX ID is loaded into tail register 306. At process block 435, counter 305 is incremented. Once the counter is incremented, the READY signal is generated by counter 305. The READY signal indicates that the linked list for the bank controller 310 is not empty.

Subsequently, control is returned to process block 405 where another transaction is received. One of ordinary skill in the art will recognize that process blocks 415 and 420 may be processed in a variety of different sequences. For example, the process disclosed in process block 420 may be executed before the process in process block 415. Alternatively, process blocks 415 and 420 may be executed in parallel.

If, however, the count at counter 305 is determined to be greater than zero, a previously received transaction is stored at head register 308. Therefore, the transaction is loaded into the write port of transaction memory 350 using the contents of tail register 306 as its address, process block 425. At process block 430, tail register 306 is loaded with the newly received TX ID. At process block 435, counter 305 is incremented. Accordingly, the READY signal continues to be generated by counter 305.

Afterward, control is returned to process block 405 where another transaction is received. Note that head register 308 remains unchanged. The bank information controls tail selector 320 in order to select which bank controller 310 will provide the write address for transaction memory 350. As described above, one of ordinary skill in the art will appreciate that process blocks 425 and 430 may be processed in a variety of different sequences.

Figure 5:
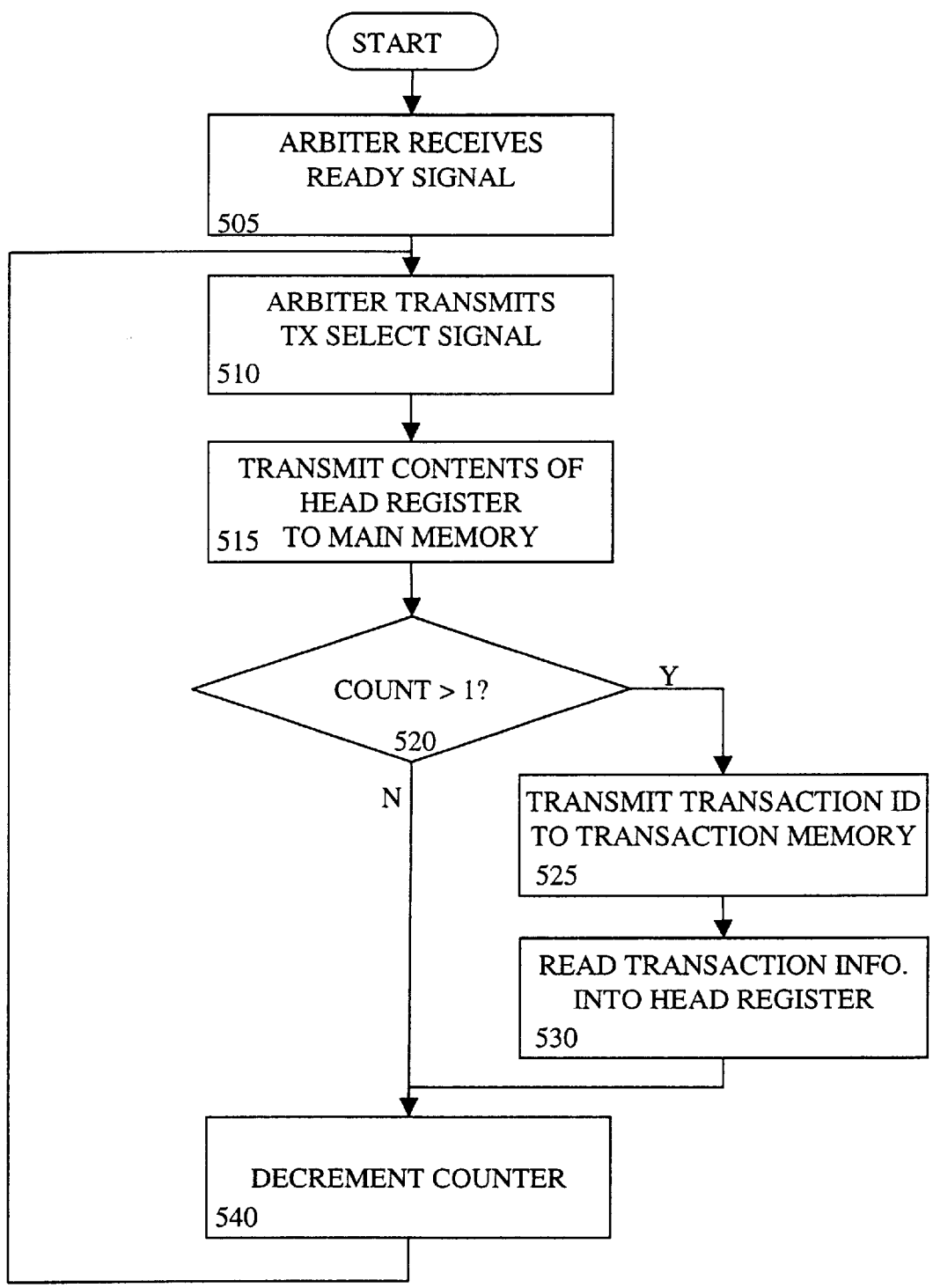
FIG. 5 is a flow diagram of one embodiment for the process of transmitting a memory transaction.

FIG. 5 is a flow diagram of one embodiment for the process of transmitting a memory transaction from linked list logic 260 to memory 113. As described above, bank controllers 310 transmit a READY signal indicating that its linked list is not empty. At process block 505, arbiter 340 reads READY signals from one or more bank controllers 310. Arbiter 340 determines which of the bank controllers 310 will next be granted access to its corresponding bank at memory 113.

At process block 510, the TX SEL signal is transmitted to the bank controllers 310 and head selector 330 in order to select the appropriate bank controller 310. At process block 515, the contents of the selected bank controller 310 is transmitted to memory 113 via head selector 330. At the selected bank controller 310, counter 305 is checked in order to ascertain the correct count. At process block 520, it is determined whether the count is greater than one.

If it is determined that the count equals one, the last transaction in the linked list for the bank controller is being transmitted. As a result, counter 305 is decremented, process block 540. No other action is taken. However, if the count is greater than one, the TX ID stored in head register 308 is transmitted to the read port of transaction memory 350 as a read address, process block 525. At process block 530, the value read from transaction memory 350 is stored into head register 308. At process block 540, counter 305 is decremented. Afterward, control is returned to process block 510 where arbiter 340 selects another bank controller 310.

Using a linked list for memory mapping is a less memory intensive since it uses one 64 deep memory (the same size as one FIFO) and creates multiple linked lists in the memory. Each linked list is equivalent to a FIFO implemented in prior out of order transaction schemes. Therefore, a more efficient method and apparatus for managing out of order memory transactions has been described.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:
    a main memory; and
    a chip set coupled to the main memory, comprising:
        mapping logic to translate transaction addresses to physical addresses; and linked list logic, coupled to the mapping logic, for managing out of order accesses to the main memory, the linked list logic including:
        a transaction memory;
        a first bank controller coupled to the transaction memory to store transaction data to be transmitted to a first bank of the main memory within the transaction memory according to a first linked list;
        a second bank controller coupled to the transaction memory to store transaction data to be transmitted to a second bank of the main memory within the transaction memory according to a second linked list;
        first selector logic coupled to the first bank controller and the second bank controller to select data to be transmitted to the transaction memory from either the first bank controller or the second bank controller;
        second selector logic coupled to the first bank controller and the second bank controller to select data to be transmitted to the main memory from either the first bank controller or the second bank controller; and
        arbitration logic coupled to the second selector logic, the first bank controller and the second bank controller.

2. The computer system of claim 1 wherein the first and second bank controllers comprise:
    a first register coupled to the first selector logic; and
    a second register coupled to the second selector logic.

3. The computer system of claim 2 wherein the first and second bank controllers further comprise:

control logic;

a counter coupled to the control logic; and third selector logic coupled to the second register.

4. A method of managing out of order memory transactions comprising:

receiving a first transaction at linked list logic within a computer system chipset to access a first bank of a main memory;

storing information corresponding with the first transaction in a first register within a first bank controller according to a first linked list;

storing transaction identification corresponding with the first transaction in a second register within the first bank controller;

receiving a second transaction at the linked list logic to access a second bank of the main memory;

storing the second transaction at the linked list logic according to a second linked list;

receiving a third transaction at the linked list logic to access the first bank of the main memory;

determining whether a transaction is stored within the first register of the first bank controller;

if so, storing information corresponding with the third transaction in a transaction memory; and storing transaction identification corresponding with the third transaction in the second register of the first bank controller.

5. The method of claim 4 wherein the information corresponding with the third transaction is stored in the transaction memory by addressing the transaction memory using the transaction identification corresponding with the first transaction.

6. The method of claim 4 wherein the process of storing the second transaction at the linked list logic according to a second linked list comprises:

storing information corresponding with the second transaction in a first register within a second bank controller; and storing transaction identification corresponding with the second transaction in a second register within the second bank controller.

7. The method of claim 6 further comprising:

receiving a fourth transaction at the linked list logic to access the second bank of the main memory;

determining whether a transaction is stored within the first register of the second bank controller;

if so, storing information corresponding with the fourth transaction in the transaction memory; and storing transaction identification corresponding with the second transaction in the second register of the second bank controller.

8. The method of claim 4 wherein determining whether a transaction is stored within the first register of the first bank controller comprises determining the status of a counter within the first bank controller.

9. The method of claim 4 comprising:

determining whether the first bank controller is to access the main memory;

if so, transmitting the information corresponding with the first transaction from the first register within the first bank controller to the first bank of the main memory.

10. The method of claim 9 further comprising:

determining whether a transaction corresponding with the first linked list is stored within the transaction memory;

if so, retrieving the information corresponding with the third transaction from transaction memory; and storing the information corresponding with the third transaction in the first register within the first bank controller.

11. A chip set comprising:

linked list logic comprising:

a transaction memory to store memory transactions to access a main memory;

a first bank controller coupled to the transaction memory to store transaction data to be transmitted to a first bank of a main memory within the transaction memory according to a first linked list;

a second bank controller coupled to the transaction memory to store transaction data to be transmitted to a second bank of the main memory within the transaction memory according to a second linked list;

first selector logic coupled to the first bank controller and the second bank controller to select data to be transmitted to the transaction memory from either the first bank controller or the second bank controller;

second selector logic coupled to the first bank controller and the second bank controller to select data to be transmitted to the main memory from either the first bank controller or the second bank controller; and arbitration logic coupled to the second selector logic, the first bank controller and the second bank controller.

12. The chip set of claim 11 wherein the first and second bank controllers comprise:

a first register coupled to the first selector logic; and a second register coupled to the second selector logic.

13. The computer system of claim 12 wherein the first and second bank controllers further comprise:

control logic;

a counter coupled to the control logic; and third selector logic coupled to the second register.

14. The chip set of claim 11 further comprising memory mapping logic coupled to the linked list logic.

15. Linked list logic comprising:

a transaction memory to store memory transactions to access a main memory;

a first bank controller coupled to the transaction memory, wherein the first bank controller stores transaction data to be transmitted to a first bank of a main memory within the transaction memory according to a first linked list;

a second bank controller coupled to the transaction memory wherein the second bank controller stores transaction data to be transmitted to a second bank of the main memory within the transaction memory according to a second linked list;

first selector logic coupled to the first bank controller and the second bank controller to select data to be transmitted to the transaction memory from either the first bank controller or the second bank controller;

second selector logic coupled to the first bank controller and the second bank controller to select data to be transmitted to the main memory from either the first bank controller or the second bank controller; and arbitration logic coupled to the second selector logic, the first bank controller and the second bank controller.

* * * * *

UNITED STATES PATENT AND TRADEMARK OFFICE
CERTIFICATE OF CORRECTION

PATENT NO. : 6,772,300 B1
DATED : August 3, 2004
INVENTOR(S) : Manseau

It is certified that error appears in the above-identified patent and that said Letters Patent is hereby corrected as shown below:

Column 7,
Line 58, before "comprising", insert -- further --.

Column 8,
Line 51, after "memory", insert -- , --.

Signed and Sealed this

Thirtieth Day of November, 2004

JON W. DUDAS
*Director of the United States Patent and Trademark Office*